(12) United States Patent
Miele et al.

(10) Patent No.: US 9,475,899 B2
(45) Date of Patent: Oct. 25, 2016

(54) SOLID COMPOSITE FLUOROPOLYMER LAYER

(71) Applicant: SOLVAY SPECIALTY POLYMERS ITALY S.P.A., Bollate (IT)

(72) Inventors: Marco Miele, Cisliano (IT); Julio A. Abusleme, Saronno (IT); Ricardo Pieri, Milan (IT)

(73) Assignee: SOLVAY SPECIALTY POLYMERS, Bollate (Milan) (IT)

( * ) Notice: Subject to any disclaimer, the term of this patent is extended or adjusted under 35 U.S.C. 154(b) by 0 days.

(21) Appl. No.: 14/649,151

(22) PCT Filed: Dec. 5, 2013

(86) PCT No.: PCT/EP2013/075624
§ 371 (c)(1),
(2) Date: Jun. 2, 2015

(87) PCT Pub. No.: WO2014/086906
PCT Pub. Date: Jun. 12, 2014

(65) Prior Publication Data
US 2015/0322187 A1 Nov. 12, 2015

(30) Foreign Application Priority Data
Dec. 5, 2012 (EP) .................................. 12195645

(51) Int. Cl.
| | | |
|---|---|---|
| C08F 214/26 | (2006.01) | |
| H01M 2/14 | (2006.01) | |
| H01M 2/16 | (2006.01) | |
| H01M 10/052 | (2010.01) | |
| H01M 10/056 | (2010.01) | |
| C08F 214/28 | (2006.01) | |

(52) U.S. Cl.
CPC ....... *C08F 214/262* (2013.01); *C08F 214/265* (2013.01); *H01M 2/145* (2013.01); *H01M 2/166* (2013.01); *H01M 10/052* (2013.01); *H01M 10/056* (2013.01); *Y02E 60/122* (2013.01); *Y02P 70/54* (2015.11)

(58) Field of Classification Search
CPC .................................. C08F 8/50; C08F 10/00
USPC ................................................. 528/481, 482
See application file for complete search history.

(56) References Cited

U.S. PATENT DOCUMENTS 8,076,025 B2   12/2011   Birke et al.

FOREIGN PATENT DOCUMENTS

| EP | 814520 A2 | 12/1997 |
|---|---|---|
| WO | 2008129041 A1 | 10/2008 |
| WO | 2010043665 A1 | 4/2010 |
| WO | 2011121078 A1 | 10/2011 |

*Primary Examiner* — Terressa Boykin

(57) ABSTRACT

The present invention pertains to a process for manufacturing a solid composite layer, said process comprising the following steps:

(i) providing a mixture comprising:
   at least one functional fluoropolymer comprising at least one hydroxyl group [polymer (F)],
   at least one metal compound of formula (I) [compound (M)]:

$$X_{4-m}AY_m$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and
   at least one inorganic filler material [filler (I)] in an amount of from 50% to 95% by weight, with respect to the total weight of said polymer (F) and said filler (I);
(ii) reacting at least a fraction of said hydroxyl group(s) of at least one polymer (F) with at least a fraction of said hydrolysable group(s) Y of at least one compound (M), so as to provide a fluoropolymer composition comprising at least one grafted fluoropolymer [polymer (Fg)] comprising pendant groups of formula $-Y_{m-1}-AX_{4-m}$, wherein m, Y, A and X have the same meaning as defined above; and
(iii) processing the fluoropolymer composition obtained in step (ii), so as to obtain a solid composite layer.

The invention also pertains to the solid composite fluoropolymer layers obtained from said process and to uses of said solid composite fluoropolymer layers as separators in electrochemical devices.

20 Claims, No Drawings

SOLID COMPOSITE FLUOROPOLYMER LAYER

This application is a U.S. national stage entry under 35 U.S.C. §371 of International Application No. PCT/EP2013/075624 filed Dec. 5, 2013, which claims priority to European application No. 12195645.2 filed on Dec. 5, 2012. The entire contents of these applications are explicitly incorporated herein by this reference.

TECHNICAL FIELD

The present invention pertains to a process for the manufacture of a solid composite fluoropolymer layer, to the solid composite fluoropolymer layer obtained therefrom and to use of the solid composite fluoropolymer layer as separator in electrochemical devices.

BACKGROUND ART

Separators for use in electrochemical devices, in particular in secondary batteries, mainly serve to physically and electrically separating the anode from the cathode of the electrochemical cell, while permitting electrolyte ions to flow there through, and must be thermally stable during operation of the same.

Additionally, performance attributes of these electrochemical devices, such as cycle life and power, can be significantly affected by the choice of the separator.

Separators may be made of polymer materials which are rendered porous or of fibrous or particulate materials including glass fibers, mineral fibers such as asbestos, ceramics, synthetic polymeric fibers as well as natural polymeric fibers such as cellulose.

Inorganic filler materials have been long used to fabricate separators having a composite structure, said composite separators comprising a silica or other ceramic filler material distributed in a polymeric binder matrix. These filler materials are produced as finely divided solid particulates and used as a vehicle for introducing porosity into the polymeric binder material used to fabricate the composite separator.

A separator precursor solution is typically formulated as an ink or paste comprising a solid particulate inorganic material dispersed in a solution of a polymer binder in a suitable solvent. The ink solution so obtained is usually applied to a surface of an electrode layer and the solvent is then removed from the solution layer so as to obtain a separator layer which adheres to the electrode.

For instance, composite separators are notably described in EP 0814520 A (IMRA AMERICA INC.) Dec. 29, 1997 and U.S. Pat. No. 8,076,025 (FRAUNHOFER-GESELLSCHAFT ZUR FOERDERUNG DER ANGEWANDTEN FORSCHUNG E.V.) Dec. 13, 2011.

In many cases, the composite separator materials contain a very high content of inorganic filler. In some instances, the composite separators so obtained exhibit poor mechanical properties and insufficient strength and ductility to be used as a free standing film.

One particular challenge has been to provide for composite separators with acceptable thickness, high strength and flexibility, especially when coated onto a substrate such as an electrode. In current lithium ion batteries using polymer separators, separators have typically a thickness of from about 20 μm to about 40 μm. When deposited on the electrodes at these thicknesses, a composite separator tends to crack during the removal of the volatile carrier. In general, cracking can be reduced by increasing the polymer content of the composite; however, porosity and so ion conductivity is reduced with increasing polymer content. This loss of ion conductivity renders the separator unusable in batteries. Separators of suitable thickness can be obtained using multiple coating and drying steps; however, multiple processing steps increase costs and introduce variability into the process and do also have thickness limitations, although these are less severe with the multiple coating approach.

The separator must be also insoluble in the electrolyte and must resist corrosion by other components in the electrochemical cell and by reaction products generated within the same.

SUMMARY OF INVENTION

It is thus an object of the present invention a process for manufacturing a solid composite layer, said process comprising the following steps:
(i) providing a mixture comprising:
   at least one functional fluoropolymer comprising at least one hydroxyl group [polymer (F)],
   at least one metal compound of formula (I) [compound (M)]:

$$X_{4-m}AY_m$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and
   at least one inorganic filler material [filler (I)] in an amount of from 50% to 95% by weight, with respect to the total weight of said polymer (F) and said filler (I);
(ii) reacting at least a fraction of said hydroxyl group(s) of the polymer(s) (F) with at least a fraction of said hydrolysable group(s) Y of the compound(s) (M), so as to provide a fluoropolymer composition comprising at least one grafted fluoropolymer [polymer (Fg)] comprising pendant groups of formula —$Y_{m-1}$-$AX_{4-m}$, wherein m, Y, A and X have the same meaning as defined above; and
(iii) processing the fluoropolymer composition obtained in step (ii), so as to obtain a solid composite layer.

It has been surprisingly found that by the process of the present invention solid composite layers are easily obtained via typical polymer processing techniques, said composite layers containing enhanced amounts of filler (I), thus possessing advantageous properties of ceramic-like materials, while still maintaining good mechanical properties, cohesion and solvent resistance which render the same suitable for being used as separators in electrochemical cells, able to withstand harsh conditions encountered during operations of the same.

The solid composite layers obtained by the process as detailed above are another aspect of the present invention; said solid composite layers can be advantageously used as separators in electrochemical devices, additionally providing for improved chemical resistance to standard electrolytes.

Also, electrochemical cells comprising the solid composite layers as defined above, and being another aspect of the present invention, are endowed with outstanding discharge capacity values.

By the term "solid composite layer", it is hereby intended to denote a composite layer in the solid state at 20° C. under atmospheric pressure.

The solid composite layer of the invention is advantageously free from any liquid medium.

By the term "liquid medium", it is hereby intended to denote a medium comprising one or more substances in the liquid state at 20° C. under atmospheric pressure.

By the term "fluoropolymer", it is hereby intended to denote a polymer comprising recurring units derived from at least one fluorinated monomer.

The functional fluoropolymer [polymer (F)] of the invention comprises recurring units derived from at least one fluorinated monomer and at least one comonomer comprising at least one hydroxyl group [comonomer (MA)].

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one comonomer (MA)" is understood to mean that the polymer (F) may comprise recurring units derived from one or more than one comonomers (MA) as defined above. In the rest of the text, the expression "comonomer (MA)" is understood, for the purposes of the present invention, both in the plural and the singular, that is to say that they denote both one or more than one comonomers (MA) as defined above.

The comonomer (MA) of the polymer (F) may be selected from the group consisting of fluorinated monomers comprising at least one hydroxyl group and hydrogenated monomers comprising at least one hydroxyl group.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The polymer (F) comprises preferably at least 0.01% by moles, more preferably at least 0.05% by moles, even more preferably at least 0.1% by moles of recurring units derived from at least one comonomer (MA) as defined above.

The polymer (F) comprises preferably at most 20% by moles, more preferably at most 15% by moles, even more preferably at most 10% by moles, most preferably at most 3% by moles of recurring units derived from at least one comonomer (MA) as defined above.

Determination of average mole percentage of comonomer (MA) recurring units in polymer (F) can be performed by any suitable method. Mention can be notably made of acid-base titration methods, well suited e.g. for the determination of the acrylic acid content, of NMR methods, adequate for the quantification of comonomers (MA) comprising aliphatic hydrogens in side chains, of weight balance based on total fed comonomer (MA) and unreacted residual comonomer (MA) during polymer (F) manufacture.

The comonomer (MA) is typically selected from the group consisting of hydrogenated monomers comprising at least one hydroxyl group.

The comonomer (MA) is preferably selected from the group consisting of (meth)acrylic monomers of formula (II) or vinylether monomers of formula (III):

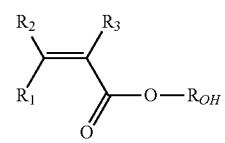

(II)

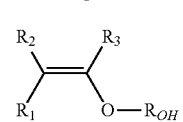

(III)

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon moiety comprising at least one hydroxyl group.

The comonomer (MA) more preferably complies with formula (II) as defined above.

The comonomer (MA) even more preferably complies with formula (II-A):

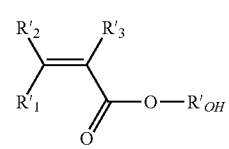

(II-A)

wherein $R'_1$, $R'_2$ and $R'_3$ are hydrogen atoms and $R'_{OH}$ is a $C_1$-$C_5$ hydrocarbon moiety comprising at least one hydroxyl group.

Non limitative examples of comonomers (MA) include, notably, hydroxyethyl (meth)acrylate, hydroxypropyl(meth)acrylate; hydroxyethylhexyl(meth)acrylates.

The comonomer (MA) is most preferably selected among the followings:
hydroxyethylacrylate (HEA) of formula:

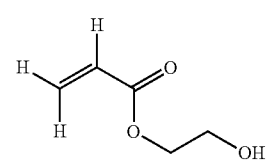

2-hydroxypropyl acrylate (HPA) of either of formulae:

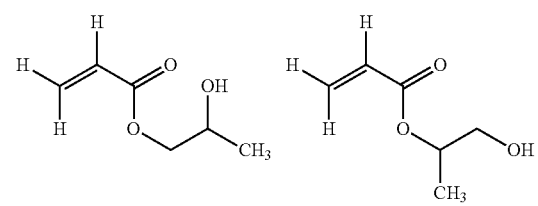

and mixtures thereof.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non limitative examples of suitable fluorinated monomers include, notably, the followings:
- $C_3$-$C_8$ perfluoroolefins, such as tetrafluoroethylene, and hexafluoropropene;
- $C_2$-$C_8$ hydrogenated fluoroolefins, such as vinylidene fluoride, vinyl fluoride, 1,2-difluoroethylene and trifluoroethylene;
- perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;
- $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$
- functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
- fluorodioxoles, especially perfluorodioxoles.

Non limitative examples of suitable hydrogenated monomers include, notably, non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 25% by moles, preferably more than 30% by moles, more preferably more than 40% by moles of recurring units derived from at least one fluorinated monomer.

The polymer (F) comprises preferably more than 1% by moles, preferably more than 5% by moles, more preferably more than 10% by moles of recurring units derived from at least one hydrogenated monomer different from comonomer (MA).

The fluorinated monomer can further comprise one or more other halogen atoms (Cl, Br, I). Should the fluorinated monomer be free of hydrogen atoms, it is designated as per(halo)fluoromonomer. Should the fluorinated monomer comprise at least one hydrogen atom, it is designated as hydrogen-containing fluorinated monomer.

Should the fluorinated monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from at least one comonomer (MA) as defined above, recurring units derived only from said hydrogen-containing fluorinated monomer, or it can be a copolymer comprising recurring units derived from at least one comonomer (MA) as defined above, said hydrogen-containing fluorinated monomer and from at least one other monomer.

Should the fluorinated monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from at least one comonomer (MA) as defined above, recurring units derived from said per(halo)fluoromonomer and from at least one other hydrogenated monomer different from said comonomer (MA), such as for instance ethylene, propylene, vinylethers, acrylic monomers.

Preferred polymers (F) are those wherein the fluorinated monomer is chosen from the group consisting of vinylidene fluoride (VDF), tetrafluoroethylene (TFE) and chlorotrifluoroethylene (CTFE).

The polymer (F) is more preferably selected from the group consisting of:
- polymers (F-1) comprising recurring units derived from at least one comonomer (MA) as defined above, from at least one per(halo)fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers, typically in amounts of from 0.01% to 30% by moles, based on the total amount of TFE and/or CTFE and said hydrogenated monomer(s); and
- polymers (F-2) comprising recurring units derived from at least one comonomer (MA) as defined above, from vinylidene fluoride (VDF), and, optionally, from one or more fluorinated monomers different from VDF.

In polymers (F-1) as defined above, the molar ratio per(halo)fluoromonomer(s)/hydrogenated comonomer(s) is typically of from 30:70 to 70:30. In polymers (F-1) as defined above, the hydrogenated monomer preferably comprises ethylene, optionally in combination with other hydrogenated monomers.

Polymers (F-1) wherein the per(halo)fluoromonomer is predominantly chlorotrifluoroethylene (CTFE) will be identified herein below as ECTFE copolymers; polymers (F-1) wherein the per(halo)fluoromonomer is predominantly tetrafluoroethylene (TFE) will be identified herein below as ETFE copolymers.

The ECTFE and ETFE copolymers (F-1) preferably comprise:
(a) from 35% to 65% by moles, preferably from 45% to 55% by moles, more preferably from 48% to 52% by moles of ethylene (E);
(b) from 65% to 35% by moles, preferably from 55% to 45% by moles, more preferably from 52% to 48% by moles of at least one of chlorotrifluoroethylene (CTFE) and tetrafluoroethylene (TFE) or mixture thereof;
(c) from 0.01% to 20% by moles, preferably from 0.05% to 18% by moles, more preferably from 0.1% to 10% by moles of at least one (meth)acrylic monomer of formula (II) as defined above.

Among polymers (F-1), ECTFE polymers are preferred.

The polymers (F-2) preferably comprise:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and (c') from 0.01% to 20% by moles, preferably from 0.05% to 18% by moles, more preferably from 0.1% to 10% by moles of at least one (meth)acrylic monomer of formula (II) as defined above.

The polymer (F) is even more preferably selected from polymers (F-2) as defined above.

The metal compound of formula $K_{4-m}AY_m$ (I) can comprise one or more functional groups on any of groups X and Y, preferably on at least one group X.

In case the metal compound of formula (I) as defined above comprises at least one functional group, it will be designated as functional metal compound; in case none of groups X and Y comprises a functional group, the metal compound of formula (I) as defined above will be designated as non-functional metal compound.

Mixtures of one or more functional metal compounds and one or more non-functional metal compounds can be used in the process of the invention and in the manufacture of the hybrid composite of the invention. Otherwise, functional metal compound(s) or non-functional metal compound(s) can be separately used.

Functional metal compounds can advantageously provide for hybrid composites having functional groups so as to further modify the chemistry and the properties of the hybrid composite over native polymer (F) and native inorganic phase.

The compound (M) preferably complies with formula (I-A):

$$R'_{4-m'}E(OR'')_{m'} \quad (I-A)$$

wherein m' is an integer from 1 to 4, and, according to certain embodiments, from 1 to 3, E is a metal selected from the group consisting of Si, Ti and Zr, R' and R", equal to or different from each other and at each occurrence, are independently selected from $C_1$-$C_{18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing fluoropolymer hybrid organic/inorganic composites which can exhibit functional behaviour in terms of hydrophilicity or ionic conductivity, functional groups of the metal compound of formula (I) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

Should the compound (M) be a functional metal compound, it more preferably complies with formula (I-B):

$$R^A_{4-m^*}E^*(OR^B)_{m^*} \quad (I-B)$$

wherein m* is an integer from 2 to 3, E* is a metal selected from the group consisting of Si, Ti and Zr, $R^A$, equal to or different from each other and at each occurrence, is a $C_1$-$C_{12}$ hydrocarbon group comprising one or more functional groups; $R^B$, equal to or different from each other and at each occurrence, is a $C_1$-$C_5$ linear or branched alkyl radical, preferably $R^B$ is methyl or ethyl.

Examples of functional metal compounds are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

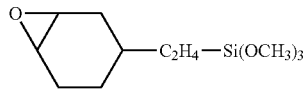

glycidoxypropylmethyldiethoxysilane of formula:

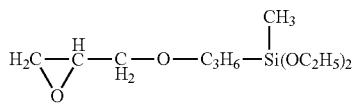

glycidoxypropyltrimethoxysilane of formula:

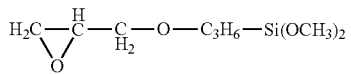

methacryloxypropyltrimethoxysilane of formula:

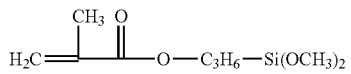

aminoethylaminpropylmethyldimethoxysilane of formula:

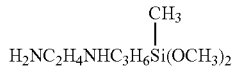

aminoethylaminpropyltrimethoxysilane of formula:

$$H_2NC_2H_4NHC_3H_6Si(OCH_3)_3$$

3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-aminopropyltriethoxysilane,
(3-acryloxypropyl)dimethylmethoxysilane,
(3-acryloxypropyl)methyldichlorosilane,
(3-acryloxypropyl)methyldimethoxysilane,
3-(n-allylamino)propyltrimethoxysilane,
2-(4-chlorosulfonylphenyl)ethyltrimethoxysilane,
2-(4-chlorosulphonylphenyl)ethyl trichlorosilane, carboxyethylsilanetriol,
and its sodium salts, triethoxysilylpropylmaleamic acid of formula:

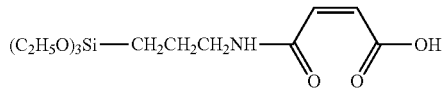

3-(trihydroxysilyl)-1-propane-sulphonic acid of formula $HOSO_2—CH_2CH_2\ CH_2—Si(OH)_3$, N-(trimethoxysilylpropyl)ethylene-diamine triacetic acid, and its sodium salts, 3-(triethoxysilyl)propylsuccinic anhydride of formula:

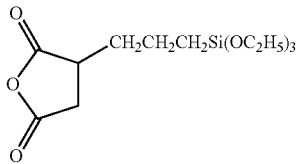

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional metal compounds are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

In step (i) of the process of the invention, the compound (M) is typically present in the mixture in an amount of from 0.1% to 95% by weight, preferably from 1% to 75% by weight, more preferably from 5% to 55% by weight, with respect to the total weight of the polymer (F), the filler (I) and the compound (M).

Several techniques can be used for reacting hydroxyl groups of at least one polymer (F) with the hydrolysable groups Y of at least one compound (M).

According to a first embodiment of the process of the invention, the polymer(s) (F) and the compound(s) (M) are reacted in molten phase at temperatures typically comprised between 100° C. and 300° C., preferably between 150° C. and 250° C., as a function of the melting point of the polymer (F).

Should the polymer(s) (F) and the compound(s) (M) be reacted in molten phase, the mixture of step (i) of the process of the invention preferably does not comprise any organic solvents (S).

Melt compounders such as extruders, melt kneaders or other devices can be advantageously used to this aim.

According to a second embodiment of the process of the invention, the polymer(s) (F) and the compound(s) (M) are reacted in liquid phase at temperatures typically comprised between 20° C. and 100° C. Temperatures between 20° C. and 90° C., preferably between 20° C. and 50° C. will be preferred.

Should the polymer(s) (F) and the compound(s) (M) be reacted in liquid phase, the mixture of step (i) of the process of the invention preferably comprises at least one organic solvent (S).

Non-limitative examples of suitable organic solvents (S) include, notably, the followings:

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, and linear or cyclic esters such as isopropyl acetate, n-butyl acetate, methyl acetoacetate, dimethyl phthalate, g-butyrolactone;

linear or cyclic amides such as N,N-diethylacetamide, N,N-dimethylacetamide, dimethylformamide and N-methyl-2-pyrrolidone.

It is understood that at least a fraction of hydroxyl groups of at least one polymer (F) are reacted with at least a fraction of hydrolysable groups Y of at least one compound (M) so as to provide a fluoropolymer composition comprising:

at least one grafted fluoropolymer [polymer (Fg)] comprising pendant groups of formula $—Y_{m-1}AX_{4-m}$, wherein m, Y, A and X have the same meaning as defined above, optionally, residual amounts of at least one compound (M), at least one inorganic filler material [filler (I)] in an amount of from 50% to 95% by weight, with respect to the total weight of said polymer (F) and said filler (I), and optionally, at least one organic solvent (S).

The polymer(s) (F) and the compound(s) (M) are preferably reacted in liquid phase in the presence of one or more further organic solvents (S).

The polymer(s) (F) and the compound(s) (M) are more preferably reacted in liquid phase in the presence of one or more organic solvents (S) selected from ketones.

The polymer(s) (F) and the compound(s) (M) are even more preferably reacted in liquid phase in the presence of acetone.

The compound(s) (M) and the pendant groups of formula $—Y_{m-1}AX_{4-m}$ of the polymer (Fg), wherein m, Y, A and X have the same meaning as defined above, are typically at least partially reacted in step (ii) of the process of the invention by hydrolysis and/or polycondensation to provide a fluoropolymer hybrid organic/inorganic composite comprising inorganic domains.

It is understood that, during hydrolysis and/or polycondensation, the hydrolysable groups Y of the compound (M) will react with the pendant groups of formula $—Y_{m-1}AX_{4-m}$ of the polymer (Fg) so as to yield a fluoropolymer hybrid organic/inorganic composite comprising polymer domains consisting of chains of polymer (F) and inorganic domains consisting of residues derived from compound (M).

The choice of the filler (I) is not particularly limited.

The filler (I) is typically provided under the form of particles.

The filler (I) particles generally have an average particle size of 0.001 μm to 1000 μm, preferably of 0.01 μm to 800 μm, more preferably of 0.03 μm to 500 μm.

The amount of the filler (I) either in the mixture of step (i) or in the fluoropolymer composition of step (ii) is preferably of from 60% to 90% by weight, more preferably of from 65% to 85% by weight, with respect to the total weight of the polymer (F) and the filler (I).

Among fillers (I) suitable for being used in the process of the invention, mention can be made of inorganic oxides, including mixed oxides, metal sulphates, metal carbonates, metal sulfides and the like.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates, all optionally containing additional metals such as sodium, potassium, iron or lithium, can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium, can be selected among synthetic clays, like notably fluorohectorite, hectorite, laponite.

The filler (I) may be also selected from ion-conducting inorganic filler materials.

By the term "ion-conducting", it is hereby intended to denote a material permitting electrolyte ions to flow there through.

Non-limitative examples of suitable ion-conducting inorganic filler materials include, notably, lithium ceramics such as $LiTaO_3$—$SrTiO_3$, $LiTi_2(PO_4)_3$—$Li_2O$ and $Li_4SiO_4$—$Li_3PO_4$.

Also, fillers (I) having on their surface reactive groups towards compound (M) can be used in the process of the invention.

Among surface reactive groups, mention is notably made of hydroxyl groups.

Without being bound by this theory, the Applicant believes that reaction between at least a fraction of hydrolysable groups Y of the compound (M) with at least a fraction of said surface reactive groups of the filler (I) can occur simultaneously with the reaction of at least a fraction of hydrolysable groups Y of the compound (M) with at least a fraction of the hydroxyl groups of the polymer (F) so that, in subsequent hydrolysis and/or polycondensation, chemical bonding between the polymer (F) and the filler (I) is likely achieved through the inorganic domains derived from the compound (M).

The filler (I) is preferably selected among inorganic oxides.

Non-(imitative examples of suitable inorganic oxides include, notably, $SiO_2$, $TiO_2$, ZnO, $Al_2O_3$.

The hydrolysis and/or polycondensation can be carried out simultaneously to the reaction of the hydroxyl groups of the polymer (F) with the hydrolysable groups Y of the compound (M) or can be carried out once said reaction has occurred.

It is further understood that, while the hydrolysis and/or polycondensation reaction may be initiated during step (ii) of reacting at least a fraction of hydroxyl groups of the polymer (F) with at least a fraction of hydrolysable groups Y of the compound (M), said reaction may be continued during step (iii) of the process of the invention.

After hydrolysis and/or polycondensation reaction, the inorganic domains residues derived from the compound (M) will be present either in the fluoropolymer composition of step (ii) and/or in the composite layer of step (iii) in an amount typically of from 0.1% to 95%, preferably of from 1% to 75% by weight, more preferably of from 5% to 55% by weight, with respect to the total weight of the polymer (F), the filler (I) and said inorganic domains residues derived from the compound (M).

It is understood that, in particular for compounds (M) wherein A is Si, said inorganic domains residues derived from at least partially hydrolysis and/or polycondensation reaction are represented by $SiO_2$.

As this will be recognized by the skilled in the art, the hydrolysis and/or polycondensation reaction usually generates low molecular weight side products, which can be notably water or alcohol, as a function of the nature of the compound (M).

In step (iii) of the process of the invention, the fluoropolymer composition is processed typically by:
manufacturing a film, and
optionally, post-treating the film so obtained, so as to obtain a solid composite layer.

The film is manufactured using techniques commonly known in the art.

Should the fluoropolymer composition be a liquid composition comprising at least one organic solvent (S), it is typically processed by coating and drying a film onto a substrate.

The fluoropolymer composition is usually processed by casting, doctor blade coating, metering rod (or Meyer rod) coating, slot die coating, knife over roll coating or "gap" coating, and the like.

The choice of the substrate is not particularly limited, being understood that the film can be manufactured directly as a unitary assembly or can be manufactured by coating onto another support surface, from which said film can be detached and individualized.

The film so obtained may then be post-treated by curing so as to obtain the solid composite layer according to the invention.

Drying can be performed under modified atmosphere, e.g. under an inert gas, typically exempt notably from moisture (water vapour content of less than 0.001% v/v), or can be performed under vacuum.

Drying can be performed at room temperature (about 25° C.) or at a temperature exceeding 25° C., this latter condition being generally preferred. The drying temperature will be selected so as to effect removal by evaporation of one or more organic solvents (S).

Curing, if any, is carried out at temperatures typically comprised between 100° C. and 250° C., preferably between 120° C. and 200° C.

It is understood that, under drying and, optionally, curing conditions, the low molecular weight side products generated by the hydrolysis and/or polycondensation reaction, which can be notably water or alcohol, as a function of the nature of the compound (M), are at least partially removed from the film, possibly further promoting, by combined action of heat and side products removal, additional hydrolysis and/or polycondensation.

Should the fluoropolymer composition be a solid composition free from any further organic solvents (S), it is typically processed by melt-processing techniques.

The fluoropolymer composition is usually processed by extrusion through a die at temperatures generally comprised between 100° C. and 300° C., preferably between 100° C. and 250° C., to yield strands which are usually cut for providing pellets.

Twin screw extruders are preferred devices for accomplishing melt compounding of the solid composition.

Films can then be manufactured by processing the pellets so obtained through traditional film extrusion techniques.

The film so obtained may then be post-treated by curing so as to obtain the solid composite layer according to the invention.

Curing is carried out at temperatures typically comprised between 100° C. and 250° C., preferably between 120° C. and 200° C.

It is understood that, under curing conditions, the low molecular weight side products generated by the hydrolysis and/or polycondensation reaction, which can be notably water or alcohol, as a function of the nature of the compound (M), are at least partially removed from the film, possibly further promoting, by combined action of heat and side products removal, additional hydrolysis and/or polycondensation.

According to an embodiment of the process of the invention, in step (iii) the fluoropolymer composition is processed by:
manufacturing a film, and
post-treating the film so obtained by hydrolysis and/or polycondensation in the presence of an aqueous medium, followed by drying and, optionally, curing, so as to obtain a solid composite layer.

It is understood that, under drying and, optionally, curing conditions, the low molecular weight side products generated by the hydrolysis and/or polycondensation reaction, which can be notably water or alcohol, as a function of the nature of the compound (M), are at least partially removed from the film, possibly further promoting, by combined action of heat and side products removal, additional hydrolysis and/or polycondensation.

By the term "aqueous medium", it is hereby intended to denote a liquid medium comprising water which is in the liquid state at 20° C. under atmospheric pressure.

The hydrolysis and/or polycondensation is usually carried out at room temperature or upon heating at temperatures lower than 100° C. The temperature will be selected having regards to the boiling point and/or stability of the aqueous medium. Temperatures between 20° C. and 90° C., preferably between 20° C. and 50° C. will be preferred.

The aqueous medium may comprise at least one acid catalyst.

The selection of the acid catalyst is not particularly limited. The acid catalyst is typically selected from the group consisting of organic and inorganic acids.

The aqueous medium typically comprises from 0.5% to 10% by weight, preferably from 1% by weight to 5% by weight of at least one acid catalyst.

The acid catalyst is preferably selected from the group consisting of organic acids.

Very good results have been obtained with formic acid.

The aqueous medium may advantageously further comprise one or more organic solvents (S).

The aqueous medium preferably consists of water and at least one acid catalyst.

According to a preferred embodiment of the process of the invention, in step (iii) the fluoropolymer composition is a liquid composition processed by:
coating and drying a film onto a substrate, and
post-treating the film so obtained by hydrolysis and/or polycondensation in the presence of an aqueous medium, followed by drying and, optionally, curing, so as to obtain a solid composite layer.

Also, another object of the present invention is a solid composite layer comprising, preferably consisting of:
at least one grafted fluoropolymer [polymer (Fg)] comprising pendant groups of formula —$Y_{m-1}AX_{4-m}$, wherein m, Y, A and X have the same meaning as defined above,
optionally, at least one compound (M), and
at least one inorganic filler material [filler (I)] in an amount of from 50% to 95% by weight, with respect to the total weight of said polymer (Fg) and said filler (I).

The solid composite layer of the invention is preferably free from any organic solvents (S).

The solid composite layer of the invention preferably comprises, more preferably consists of, a fluoropolymer hybrid organic-inorganic composite comprising inorganic domains obtainable by hydrolysing and/or polycondensing:
a grafted fluoropolymer [polymer (Fg)] comprising pendant groups of formula —$Y_{m-1}AX_{4-m}$, wherein m, Y, A and X have the same meaning as defined above,
optionally, at least one compound (M), and
at least one inorganic filler material [filler (I)] in an amount of from 50% to 95% by weight, with respect to the total weight of said polymer (Fg) and said filler (I).

The solid composite layer is advantageously obtainable by the process of the invention.

The amount of the filler (I) in the solid composite layer is preferably of from 60% to 90% by weight, more preferably of from 65% to 85% by weight, with respect to the total weight of the polymer (Fg) and the filler (I).

Further, another object of the present invention is use of the solid composite layer according to the invention for the manufacture of a separator for use in electrochemical devices.

Still, another object of the present invention is the separator so obtained, said separator comprising at least one solid composite layer according to the invention.

The separator of the invention is typically a porous separator.

The porous separator of the invention generally has a porosity (c) of advantageously at least 5%, preferably at least 10%, more preferably at least 20% and advantageously of at most 90%, preferably at most 80%.

The porous separator of the invention generally has an average pore diameter (d) of advantageously at least 0.01 µm, preferably at least 0.05 µm, more preferably at least 0.1 µm and advantageously of at most 30 µm, preferably at most 10 µm.

The separator of the invention usually has a thickness comprised between 5 µm and 50 µm, preferably between 20 µm and 30 µm.

Non-limitative examples of suitable electrochemical devices include, notably, secondary batteries, especially, alkaline or an alkaline-earth secondary batteries such as lithium ion batteries, and capacitors, especially lithium ion capacitors.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials
Polymer (F1)—VDF/HFP/HEA Terpolymer

In a 4 lt. reactor equipped with an impeller running at a speed of 880 rpm were introduced in sequence 2245 g of demineralized water and 0.7 g of METHOCEL® K100 GR suspending agent and 1 g of HEA. The reactor was vented and pressurized with nitrogen to 1 bar, then 4.2 g of a 75% by volume solution of t-amyl perpivalate initiator in isododecane were introduced into the reactor, followed by 119 g of HFP monomer and 1057 g of VDF monomer. The reactor was then gradually heated to 52° C. to a final pressure of 110 bar. Temperature was maintained constant at 55° C. throughout the whole trial. Pressure was maintained constant at 110 bar throughout the whole trial by feeding a 14.4 g/l aqueous solution of hydroxyethyl acrylate (HEA) monomer to a total of 810 ml. After 317 minutes the polymerization run was stopped by degassing the suspension until reaching atmospheric pressure. The polymer so obtained was then recovered, washed with demineralised water and oven-dried at 50° C. (866 g). The polymer so obtained contained 96.7% by moles of VDF, 2.3% by moles of HFP and 1.0% by moles of HEA, as determined by NMR. The polymer had a melting point of 156° C., as measured according to ASTM D 3418 at a heating rate of 10° C./min, and a melt flow index of 4.1 g/10 min, as measured according to ASTM D 1238 (230° C., 2.16 Kg).

Polymer (F2)—VDF/HFP/HEA Terpolymer

The same procedure as detailed hereinabove for the manufacture of polymer (F1) was followed but with no charge of HEA initial and at 57° C. instead of 55° C. The polymer so obtained contained 96.7% by moles of VDF, 2.3% by moles of HFP and 1.0% by moles of HEA, as determined by NMR. The polymer had a melting point of 155° C., as measured according to ASTM D 3418 at a heating rate of 10° C./min, and a melt flow index of 8 g/10 min, as measured according to ASTM D 1238 (230° C., 2.16 Kg).

Polymer (F3)—VDF/HFP/HEA Terpolymer

The same procedure as detailed hereinabove for the manufacture of polymer (F1) was followed but with no charge of HEA initial. The polymer so obtained contained 96.7% by moles of VDF, 2.3% by moles of HFP and 1.0% by moles of HEA, as determined by NMR. The polymer had a melting point of 155° C., as measured according to ASTM D 3418 at a heating rate of 10° C./min, and a melt flow index of 4.2 g/10 min, as measured according to ASTM D 1238 (230° C., 2.16 Kg).

Polymer (F4)—VDF/HFP/HEA Terpolymer

The polymer contained 96.7% by moles of VDF, 2.3% by moles of HFP and 1.0% by moles of HEA, as determined by NMR. The polymer had a melting point of 153.5° C., as measured according to ASTM D 3418 at a heating rate of 10° C./min, and a melt flow index of 15 g/10 min, as measured according to ASTM D 1238 (230° C., 2.16 Kg).

SOLEF® 21216 VDF/HFP Copolymer

The polymer contains 6% by moles of HFP and 94% by moles of VDF, as determined by NMR. The polymer has a melting point of 135° C., as measured according to ASTM D 3418 at a heating rate of 10° C./min, and a melt flow index of 1.5 g/10 min, as measured according to ASTM D 1238 (230° C., 21.6 Kg).

Tensile Test Measurements

Tensile measurements were carried out according to ASTM D638 standard procedure, type V, grip distance 25.4 mm.

EXAMPLE 1

In a glass vial containing a magnetic PTFE stir bar, 1 g of any of polymer (F1) or polymer (F2) or polymer (F3) powder was dissolved in 9 g of acetone; the mixture was stirred at 500 rpm for 10 minutes at room temperature and immediately after for other 10 minutes at 40° C. A clear solution was obtained. Then, 5.67 g of Silicon dioxide ceramic particles (from Sigma-Aldrich), with a particle size distribution of about 99% in the range 0.5-10 µm (approximately 80% in the range 1-5 µm) were added to the mixture while keeping the stirring at 500 rpm. The ratio PVDF/SiO$_2$ in the mixture was kept at 15/85 w/w with a total solid content of the mixture of about 43% by weight.

The stirring was kept at 500 rpm for 10 minutes at room temperature. Then, 0.69 g (3.3 mmol) of TEOS were added drop-wise to the stirred solution. The silica content, calculated assuming complete TEOS hydrolysis/polycondensation to SiO$_2$, was 3% referred to the total solid content of the mixture. The stirring was kept for other 10 minutes at room temperature.

The mixture so obtained was casted with a casting-knife by the help of a motorized film applicator (Elcometer 4340) set at a speed of 20 mm/s. The support for the casting was a 120 µm co-laminated FEP/PAI/FEP film. After 10 minutes of acetone evaporation at room temperature, the stand-alone film was detached from the support. The resulting film was homogeneous and opaque. The thickness of the film was around 20-30 µm.

Punched discs of said film were placed each in a vial.

To promote the hydrolysis/polycondensation of the TEOS, 0.23 g of formic acid (85%) and 0.5 g of demineralised water were added directly into the dry vial onto the discs of the film. Each disc was left for 1 hour at room temperature and then washed with demineralised water. Finally, the discs were placed for 30 minutes in a ventilated oven at 150° C. so as to complete the TEOS hydrolysis/polycondensation and dry the specimens.

EXAMPLE 2

The same procedure as detailed under Example 1 was followed but using polymer (F4) instead of polymer (F1), polymer (F2) or polymer (F3) under the following conditions:
  1.00 g of Silicon dioxide ceramic particles (from Sigma-Aldrich) with a particle size distribution of about 99% in the range 0.5-10 µm (approximately 80% in the range 1-5 µm) were added;
  the ratio PVDF/SiO$_2$ in the mixture was kept at 50/50 w/w with a total solid content of the mixture of about 20% by weight;
  0.215 g (1.0 mmol) of TEOS were added drop-wise to the stirred solution; and
  the silica content, calculated assuming complete TEOS hydrolysis/polycondensation to SiO$_2$, was 3% referred to the total solid content of the mixture.

EXAMPLE 3

The same procedure as detailed under Example 1 was followed but using polymer (F4) instead of polymer (F1), polymer (F2) or polymer (F3) under the following conditions:
  2.33 g of Silicon dioxide ceramic particles (from Sigma-Aldrich) with a particle size distribution of about 99% in the range 0.5-10 µm (approximately 80% in the range 1-5 µm) were added;
  the ratio PVDF/SiO$_2$ in the mixture was kept at 30/70 w/w with a total solid content of the mixture of about 20% by weight;

0.360 g (1.7 mmol) of TEOS were added drop-wise to the stirred solution; and the silica content, calculated assuming complete TEOS hydrolysis/polycondensation to $SiO_2$, was 3% referred to the total solid content of the mixture.

EXAMPLE 4

The same procedure as detailed under Example 1 was followed but using polymer (F4) instead of polymer (F1), polymer (F2) or polymer (F3) under the following conditions:

1.00 g of Silicon dioxide ceramic particles (from Sigma-Aldrich) with a particle size distribution of about 99% in the range 0.5-10 μm (approximately 80% in the range 1-5 μm) were added;

the ratio $PVDF/SiO_2$ in the mixture was kept at 50/50 w/w with a total solid content of the mixture of about 20% by weight;

0.767 g (3.7 mmol) of TEOS were added drop-wise to the stirred solution; and the silica content, calculated assuming complete TEOS hydrolysis/polycondensation to $SiO_2$, was 10% referred to the total solid content of the mixture.

The film so obtained exhibited a modulus of 825 MPa, as measured according to ASTM D638 standard procedure as detailed hereinabove.

COMPARATIVE EXAMPLE 1

The same procedure as detailed under Example 1 was followed but without adding TEOS to the mixture.

COMPARATIVE EXAMPLE 2

The same procedure as detailed under Example 1 was followed but using SOLEF® 21216 VDF/HFP copolymer instead of polymer (F1), polymer (F2) or polymer (F3).

COMPARATIVE EXAMPLE 3

The same procedure as detailed under Comparative Example 1 was followed but using SOLEF® 21216 VDF/HFP copolymer instead of polymer (F1), polymer (F2) or polymer (F3).

Storage Test

The storage test was carried out by dipping the film disc prepared according to any one of Examples 1 to 5 in an excess of electrolyte solution containing 1 M lithium hexafluorophosphate ($LiPF_6$) dissolved in a solvent mixture of ethylene carbonate (EC) and dimethyl carbonate (DMC) at a 1:1 weight ratio, followed by aging in oven at 80° C. for 4 hours. After the test, a visual observation was reported. The 'fail' classification means that the disc is dissolved after the test, while 'pass' refers to an intact specimen.

The results of the storage test are reported in Table 1 here below.

TABLE 1

| | 80° C. (4 hours) |
|---|---|
| Example 1 | pass |
| Example 2 | pass |
| Example 3 | pass |
| Example 4 | pass |
| C. Example 1 | fail |
| C. Example 2 | fail |
| C. Example 3 | fail |

It has been thus found that the film discs prepared according to the process of the invention, by reacting a polymer (F) and a compound (M), in the presence of a filler (I) in an amount of from 50% to 95% by weight, with respect to the total weight of said polymer (F) and said filler (I), all successfully passed the storage test and advantageously did not dissolve in the electrolyte solution, in particular at high temperatures.

Also, it has been found that the solid composite layers according to the invention, despite containing a filler (I) in an amount of from 50% to 95% by weight, with respect to the total weight of the polymer (F) and said filler (I), advantageously exhibited good mechanical properties, in particular good modulus values, and good cohesion to be advantageously used as free standing films.

EXAMPLE 5

Coin-type half cells (CR2032) were used for the charge and discharge experiments using the film disc prepared from polymer (F3) according to Example 1. They were assembled in an Ar-filled glove box with less than 1 ppm each of oxygen and moisture.

Positive electrodes were constructed from $LiFePO_4$ (82% by weight), carbon black (10% by weight) and SOLEF® 5130 polyvinylidene fluoride binder (8% by weight) in N-methylpyrrolidone. The cathode material was coated onto an aluminium current collector. The electrodes were dried in a vacuum oven and then punched at 12 mm diameter.

The electrolyte solution used was 1 M lithium hexafluorophosphate ($LiPF_6$) dissolved in a solvent mixture of ethylene carbonate (EC) and dimethyl carbonate (DMC) at a 1:1 weight ratio.

A 14 mm disk shape of lithium foil was used as counter electrode (anode). Charge-discharge cycling tests were galvanostatically performed at a 0.05 C rate in the range 2.5 V to 4 V vs. Li/Li+, using a computer-controlled battery measurement system (ARBIN BT-2000).

After the first formation cycle of charge and discharge, all cells were charged and the subsequent discharge capacity was evaluated after aging in oven at 80° C. for 4 h.

COMPARATIVE EXAMPLE 4

The same procedure as detailed under Example 2 was followed for the manufacture of the coin-type half cells (CR2032) but using the film disc prepared from polymer (F3) according to Comparative Example 1.

COMPARATIVE EXAMPLE 5

The same procedure as detailed under Example 2 was followed for the manufacture of the coin-type half cells (CR2032) but using the film disc prepared from SOLEF® 21216 VDF/HFP copolymer according to Comparative Example 3.

Table 2 here below reports the values of discharge capacity before and after the aging in the oven.

TABLE 2

| Separator | Discharge Capacity [mAh/g] 1 cycle | Discharge Capacity [mAh/g] after aging | Δ Discharge Capacity [%] |
|---|---|---|---|
| Example 5 | 118.93 | 74.13 | −38 |
| C. Example 4 | 37.42 | 0.69 | −98 |
| C. Example 5 | 138.12 | 1.80 | −99 |

It has been thus found that the solid composite layers according to the invention may be advantageously used as separators in electrochemical cells.

The invention claimed is:

1. A process for heat treating a composition (C) which contains at least one polymer (F), wherein polymer (F) is a melt-processible perfluoropolymer formed of tetrafluoroethylene (TFE) copolymer with one or more perfluorinated comonomer (F) containing at least one unsaturation of ethylene type in amounts from 0.5% to 13% by weight; the process comprising heat-treating composition (C) at a temperature of at least 260° C. and in the absence of a melt flowable polytetrafluoroethylene (PTFE):
   for at least 24 hours, and/or
   wherein the maximum temperature of heat-treating composition (C) is:
      (i) a temperature such that composition (C) is in the solid state during heat treatment; and/or
      (ii) below the initial melting temperature of composition (C); and/or
      (iii) below the initial melting temperature of polymer (F).

2. The process according to claim 1, wherein comonomer (F) contains at least one unsaturation of ethylene type in amounts from 0.6% to 11% by weight.

3. The process according to claim 1, wherein comonomer (F) contains one unsaturation of ethylene type in amounts from 0.8% to 9% by weight.

4. The process according to claim 1, wherein comonomer (F) is selected from:
   $C_3$-$C_8$ perfluoroolefins;
   $CF_2$=$CFOR_f$ perfluoroalkylvinylethers (PAVE), wherein $R_f$ is a $C_1$-$C_6$ perfluoroalkyl;
   $CF_2$=$CFOX$ perfluorooxyalkylvinylethers wherein X is a $C_1$-$C_{12}$ perfluorooxyalkyl having one or more ether groups; and
   perfluorodioxoles.

5. The process according to claim 4, wherein comonomer (F) is selected from the following comonomers:
   PAVEs selected from perfluoromethylvinylether (PMVE), perfluoroethylvinylether (PEVE), perfluoropropylvinylether (PPVE), and mixtures thereof;
   perfluoromethoxy vinyl ether (MOVE) of general formula $CF_2$=$CFOCF_2OR_{f2}$, wherein $R_{f2}$ is a linear or branched $C_1$-$C_6$ perfluoroalkyl group, cyclic $C_5$-$C_6$ perfluoroalkyl group, a linear or branched $C_2$-$C_6$ perfluoroxyalkyl group; and
   perfluorodioxoles having the following formula:

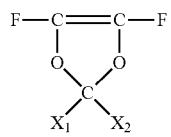

wherein $X_1$ and $X_2$, equal to or different from each other, are selected between F and $CF_3$, preferably F.

6. The process according to claim 4, wherein comonomer (F) is selected from PMVE, PEVE, PPVE, MOVE, and combinations thereof.

7. The process according to claim 4, wherein polymer (F) is a TFE copolymer consisting essentially of:
   (a) from 0.5 to 8% by weight of recurring units derived from PPVE; and
   (b) recurring units derived from TFE, in such an amount that the sum of the percentages of the recurring units (a) and (b) is equal to 100% by weight.

8. The process according to claim 1, wherein polymer (F) further comprises recurring units derived from at least one $C_3$-$C_8$ perfluoroolefin.

9. The process according to claim 6, wherein polymer (F) is a TFE copolymer consisting essentially of:
   (a) from 0 to 6% by weight of recurring units derived from PMVE;
   (b) from 0.4 to 5% w by weight of recurring units derived from one or more than one fluorinated PAVE comonomer different from PMVE;
   (c) from 0 to 6% by weight of recurring units derived from at least one $C_3$-$C_8$ perfluoroolefins; and
   (d) recurring units derived from TFE, in such an amount that the sum of the percentages of the recurring units (a), (b), (c) and (d) is equal to 100% by weight.

10. The process according to claim 1, wherein composition (C) consists of polymer (F).

11. The process according to claim 1, wherein the temperature of heat treatment for composition (C) is at least 270° C.

12. The process according to claim 1, wherein heat-treating composition (C) is carried out at a temperature of at least 260° C. for at least 24 hours and wherein the maximum temperature of heat-treating composition (C) is:
   (i) a temperature such that composition (C) is in the solid state during heat treatment;
   (ii) below the initial melting temperature of composition (C); and/or
   (iii) below the initial melting temperature of polymer (F).

13. A process according to claim 1, further comprising processing composition (C) in a molten state, so as to provide a solid shaped article, such that heat treating composition (C) occurs while composition (C) is in the form of said solid shaped article.

14. A polymer (F1), wherein polymer (F1) is a melt-processible perfluoropolymer formed of tetrafluoroethylene (TFE) copolymer with one or more perfluorinated comonomer (F) containing at least one unsaturation of ethylene type in amounts from 0.5% to 13% by weight, wherein the following inequality is satisfied:

$$Tm(I) > 329.15 - 6 \times [M]$$

wherein:
      Tm(I) is the initial melting temperature of polymer (F1) measured in degrees;
      [M] is the % weight of recurring units derived from comonomer (F) in polymer (F1).

15. The polymer (F1) of claim 14, wherein polymer (F1) is made by a process comprising heat-treating polymer (F1) at a temperature of at least 260° C. and in the absence of a melt flowable polytetrafluoroethylene (PTFE):
   for at least 24 hours, and/or
   wherein the maximum temperature of heat-treating polymer (F1) is:
      (i) a temperature such that polymer (F1) is in the solid state during heat treatment; and/or
      (ii) below the initial melting temperature of polymer (F1).

16. The polymer (F1) of claim 14, wherein comonomer (F) contains at least one unsaturation of ethylene type in amounts from 0.6% to 11% by weight.

17. The polymer (F1) of claim 14, wherein comonomer (F) contains at least one unsaturation of ethylene type in amounts from 0.8% to 9% by weight.

18. The process according to claim 5, wherein comonomer (F) is selected from the following comonomers:

PAVEs selected from $CF_2=CFOCF_3$, $CF_2=CFOC_2F_5$, $CF_2=CFOC_3F_7$, and mixtures thereof;

MOVEs selected from $CF_2=CFOCF_2OCF_2CF_3$, $CF_2=CFOCF_2OCF_2CF_2OCF_3$, or $CF_2=CFOCF_2OCF_3$; and perfluorodioxoles having the following formula:

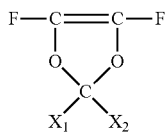

wherein $X_1$ and $X_2$ are each F.

19. The process according to claim 11, wherein the temperature of heat treatment for composition (C) is at least 300° C.

20. The process according to claim 11, wherein the temperature of heat treatment for composition (C) is at least 310° C.

\* \* \* \* \*